(No Model.) 3 Sheets—Sheet 3.

J. MILLER.
GRAIN THRASHING AND SEPARATING MACHINE.

No. 274,097. Patented Mar. 13, 1883.

WITNESSES

INVENTOR
Jacob Miller

Attorney

UNITED STATES PATENT OFFICE.

JACOB MILLER, OF CANTON, OHIO.

GRAIN THRASHING AND SEPARATING MACHINE.

SPECIFICATION forming part of Letters Patent No. 274,097, dated March 13, 1883.

Application filed March 31, 1882. Renewed January 27, 1883. (No model.)

*To all whom it may concern:*

Be it known that I, JACOB MILLER, a citizen of the United States, residing at Canton, in the county of Stark and State of Ohio, have invented certain new and useful Improvements in Grain Thrashing and Separating Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in grain thrashing and separating machines; and it consists of a combined fan and beater of peculiar construction, which will be more particularly hereinafter described, located at the rear of and slightly above the rear end of the extended portion of the concave.

My invention consists, further, in certain details of construction, which will be more fully described, and set forth in the claims.

Figure 1:
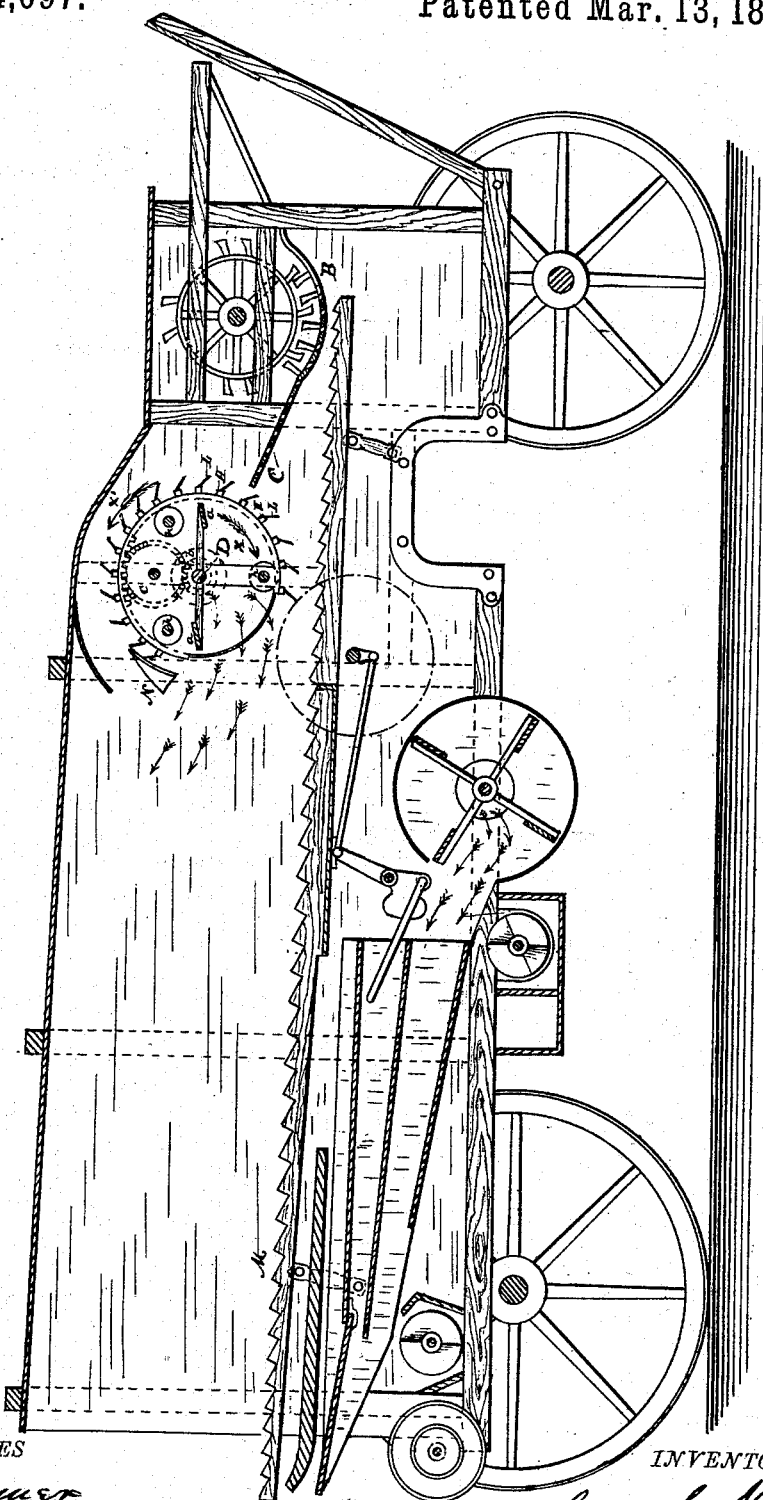
Figure 2:
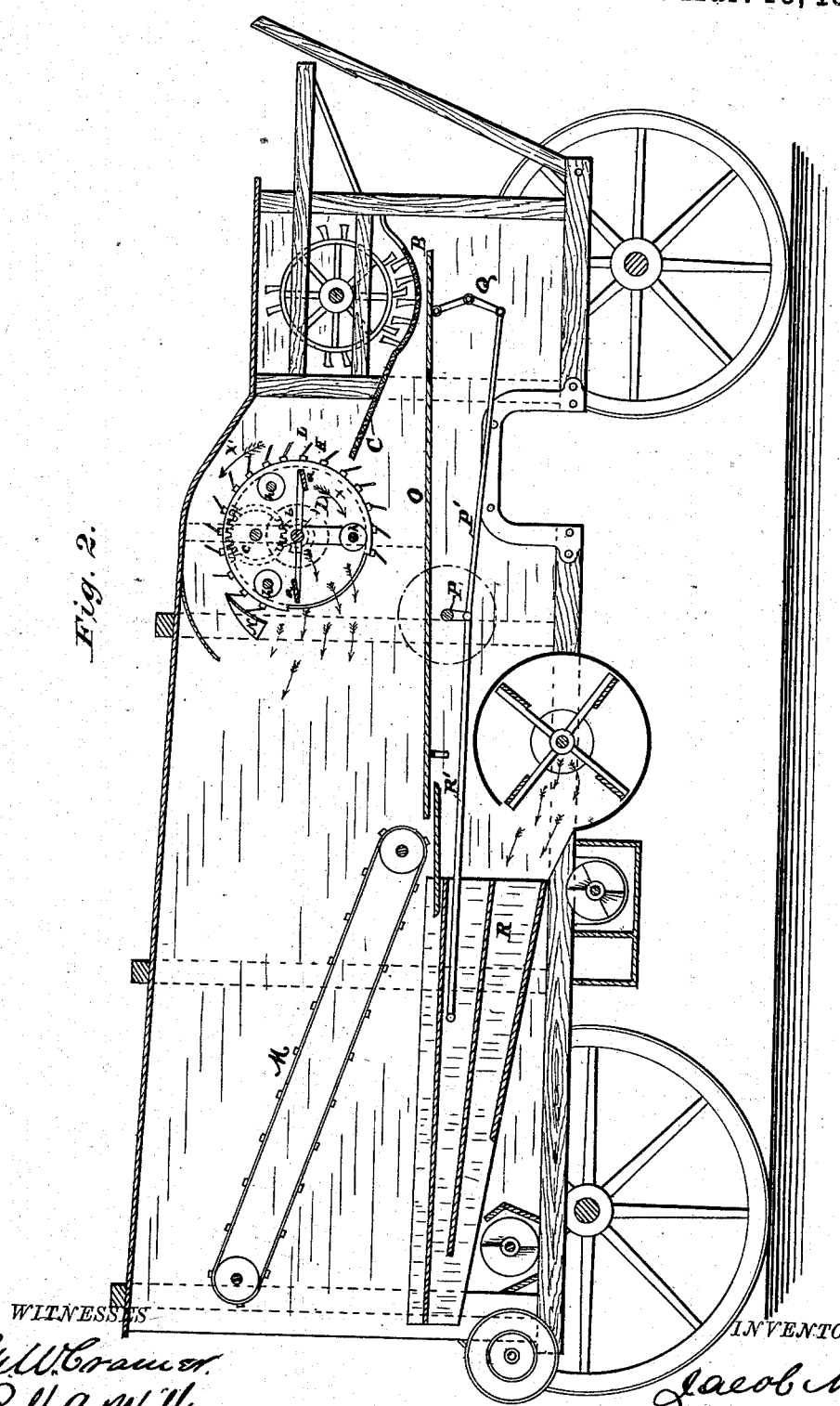
Figure 3:
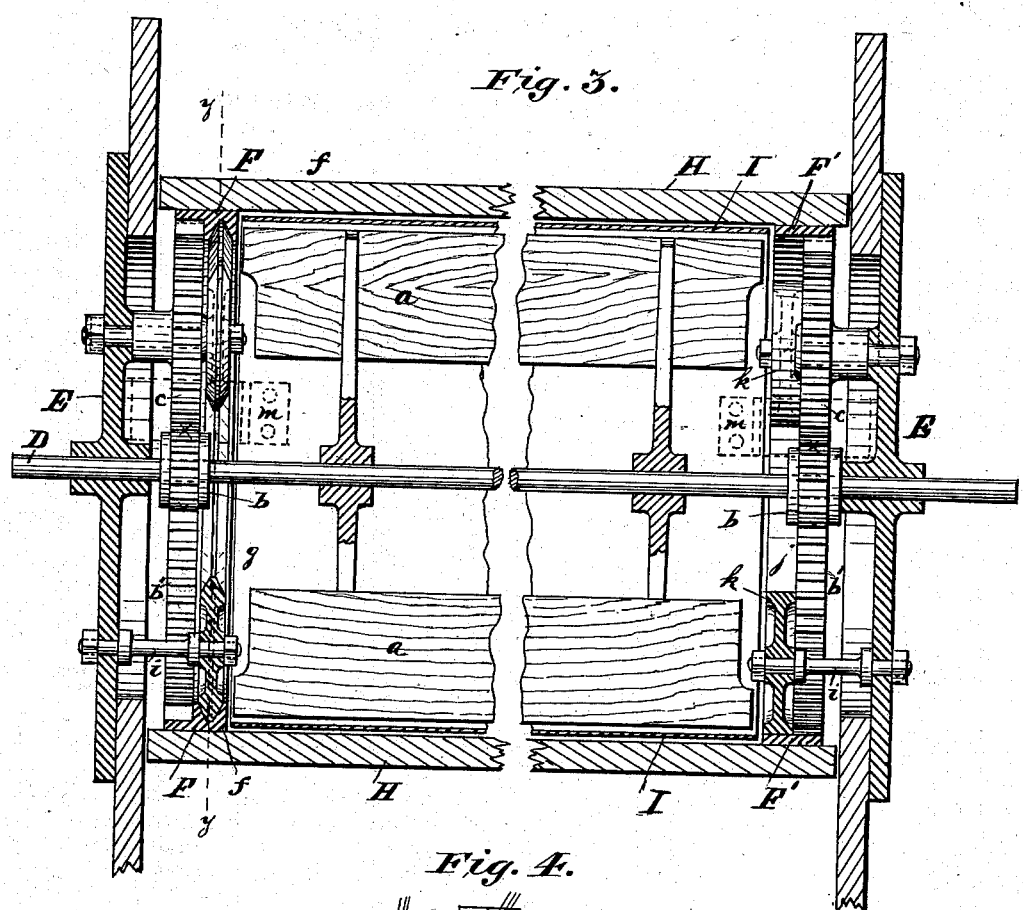
Figure 4:
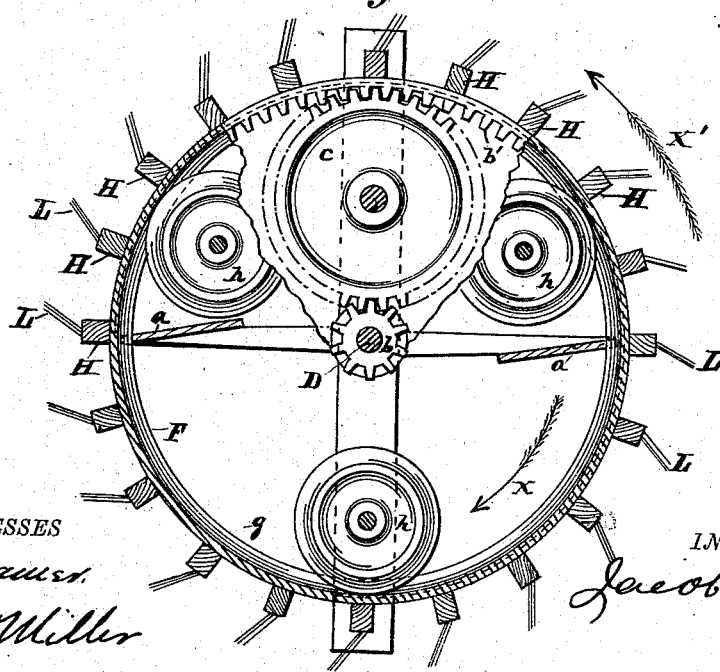

In the drawings, Figure 1 is a longitudinal vertical section. Fig. 2 is also a longitudinal vertical section, showing my improved device as applied to a machine having an endless carrier. Fig. 3 is a longitudinal sectional view of my improved fan-blower and beater combined. Fig. 4 is an end view of the same with parts broken away.

A indicates the frame-work and housing of the machine, mounted on suitable wheels and provided with a thrashing-cylinder, as is common in this class of machines.

B is a concave, provided with a perforated extension, C, said extension being placed in an upwardly-inclined position to give to the straw and chaff, as they are driven forward by the velocity of the thrashing-cylinder, an upward direction.

To the rear of and slightly above the extension C, I place my combined beater and fan-blower, which I will now proceed to describe in detail.

D is a shaft, properly journaled in the frame-work of the machine, to which are secured the fan-blades $a$ $a$, as in the ordinary construction of grain-fans, said shaft being driven by any suitable means. On the shaft D, and within the sides of the casing, are secured the pinion-wheels $b$ $b$, which mesh into and drive the pinion-wheels $c$ $c$. The pinion-wheels $c$ $c$ are mounted on axles, one end of which is securely fastened in the brackets E E in the sides of the machine, and impart motion to the internally-pinioned rims F and F', to which the beater-blades are attached. The rims F F' are provided with pinions or an internal gear, $b'$, in which the pinion-wheels $c$ $c$ mesh, and by which motion is imparted to said rims. The rim F is provided on its inner surface with an enlargement, $f$, in which is located a V-shaped groove, $g$, for the reception of the V-shaped friction-wheels $h$, said friction or supporting wheels being mounted on spindles secured to the sides of the machine, as shown at $i$, Fig. 3, and thus support and guide the rim F. The rim F' is provided on its inner portion with a plain surface or track, $j$, for the friction and supporting wheels $k$, which are also mounted on spindles secured in the sides of the machine.

H are beaters or cross-bars which connect the rims F and F', thus forming an open drum. The beaters or cross-bars H are provided with wires L or other flexible material for engaging with and carrying over the straw from the perforated extension.

I is a sheet-metal casing, which partially incloses the fan and fan-shaft, and is located between the beater-drum and fan. The casing I is held in position by means of brackets $m$, secured thereto and also to the sides of the machine, as shown in dotted lines in Fig. 3, the brackets being so bent as to allow the rims and beaters to rotate around said casing. The casing I is open at its rear side, as indicated by the arrows in Figs. 1 and 2, to permit the air-blast from the fans to impinge on the straw as it is brought over and thrown back by the beater-drum, and blow it rearward onto the straw-carrier.

The operation of my combined beater and fan is as follows: Power being applied to the fan-shaft D, it is caused to rotate, and with it the spur or pinion wheels $b$ $b$, which are secured thereto. The pinions $b$ $b$ mesh with and impart motion to the larger pinions, $c$ $c$, and they in turn mesh with and impart motion to the rims F and F' and beaters H, secured thereto, the friction-wheels $h$ and $k$ serving to steady, support, and keep the beater-drum in proper position. The beater-drum, being in close proximity to the perforated extension of the concave, catches the straw as it leaves the concave and throws or carries it over toward the rear of the machine, where it comes in contact with the air-blast, which gives it further impetus rearward, and at the same time carries the chaff and dust back to the rear of the machine, where the carriers M receive and carry it away.

N is a clearer or wiper, which serves to clear the straw from the beaters H and brushes L.

In Figs. 1 and 2, I have shown the shaker-board extending back to the front of the thrashing-cylinder, so that the thrashed grain which falls through the perforated concave and its extension, together with the grain which is beaten from the straw by the beater-drum, will be conducted back to the separating devices, which are of the usual construction. In Fig. 1, I have shown the shaker-board and straw-carrier combined, while in Fig. 2 they are separate. The shaker-board O in Fig. 2 is of the ordinary construction, is hung in bearings, and has a reciprocating motion imparted to it by means of the crank-shaft P, pitman P', and bent or bell-crank lever Q. The separating-shoe R, containing the riddles, is also connected to the shaft P by means of the pitman R', whereby the shaker-board O and separating-shoe R have a simultaneous reciprocating motion in opposite directions imparted to them from the same shaft.

M is an endless carrier, onto which the straw and chaff are blown by the fan-blast, and are conducted over the rear end of the machine, while the loose grains which may have been carried over by the beater-drum will fall onto the shaker-board and be conducted to the separating-shoe.

It is obvious that in lieu of the beater-drum endless traveling belts provided with beaters and armed with brushes may be made to travel around the fan-drum by means of flexible or jointed cogged sections meshing with the pinion-wheels c c and driven by the pinions on the fan-shaft; or other like devices may be used without departing from the spirit of my invention.

It will be observed when motion is imparted to the fan-shaft in the direction of the arrow x that by means of the interposed pinions c c the beater-drum or other carrier will be caused to travel in an opposite direction, as indicated by the arrow x'.

It is also obvious that in lieu of the fan-blast I may employ a blast of air on the inside of the beater or carrier, derived from any other source—as, for instance, a pipe may be connected to a "Root" or other blower and extended into the interior of the beater or carrier, said pipe being perforated on the rear side to permit the blast to strike the straw, &c., which has been carried over by the beater or carrier and blow it rearward. Such a construction will come within and be embraced by the spirit of my invention; but for all practical purposes the fan herein described will be sufficient.

Having thus described my invention, what I claim as new, and desire to secure by Letters Patent, is—

1. In a machine for thrashing and separating grain, the combination of a thrashing mechanism, a straw beater and carrier, and means, substantially as described, for producing a rearwardly-directed air-blast, said means being located within the beater or carrier, as set forth.

2. In a machine for thrashing and separating grain, a straw carrier and beater, in combination with a fan located within said beater or carrier, as set forth.

3. In a machine for thrashing and separating grain, a drum provided with beating and carrying bars on its surface, combined with a fan located within said drum, as set forth.

4. In a thrashing and grain-separating machine, a drum provided with beating and carrying bars and rotated in one direction, combined with a fan located within said drum and rotated in an opposite direction to that of the beater-drum, as set forth.

5. In a thrashing and grain-separating machine, a beater or carrier rotated in one direction, combined with a fan located within said beater or carrier, rotated or impelled in an opposite direction, as set forth.

6. In a grain thrashing and cleaning machine, the combination of a thrashing-cylinder, a concave and its extension, a beating and straw-carrying drum, a shaker-board, and a fan-blower located within said beater-drum, said drum and beater being located at the rear end of and above the concave and its extension, and by which the straw and chaff are thrown and blown rearward and so much of the grain as is free is permitted to fall onto the shaker-board below.

7. In a grain thrashing and separating machine, the combination of the fan, its shaft D, and the pinion-wheels b b with the pinion-wheels c c, pinioned rims F and F', and beater or carrier bars, as described.

8. The combination, in a grain thrashing and separating machine, of the fan-shaft D and pinion-wheels b b and c c with the rims of the beater-drum or carrier, and the guiding and supporting wheels h h h, as set forth.

9. The combination of the fan-shaft D and pinion-wheels d d c c with the beater-drum or carrier and casing I, as set forth.

10. The combination of the beater-drum or carrier, devices, substantially such as described, for creating an internal air-blast within said beater or carrier, and the wiper or scraper N, whereby the straw is freed from the beater-arms and brought in contact with the fan-blast.

In testimony whereof I affix my signature in presence of two witnesses.

JACOB MILLER.

Witnesses:
M. W. CRAMER,
ROBT. A. MILLER.